United States Patent [19]

Shinoda et al.

[11] Patent Number: 5,412,067
[45] Date of Patent: May 2, 1995

[54] PREPARATION PROCESS OF POLYESTER

[75] Inventors: Hosei Shinoda; Masami Ohtaguro; Akihiro Funae; Shigeru Iimuro, all of Aichi, Japan

[73] Assignee: Mitsui Toatsu Chemicals, Inc., Tokyo, Japan

[21] Appl. No.: 235,534

[22] Filed: Apr. 29, 1994

[30] Foreign Application Priority Data

May 10, 1993 [JP] Japan .................................. 5-108412
Dec. 27, 1993 [JP] Japan .................................. 5-332006

[51] Int. Cl.6 ............................................. C08G 63/06
[52] U.S. Cl. ................................... 528/361; 528/354; 528/355; 528/357
[58] Field of Search ................ 528/354, 355, 357, 361

[56] References Cited

U.S. PATENT DOCUMENTS

| | | | |
|---|---|---|---|
| 3,442,871 | 5/1969 | Schmitt et al. | 528/357 |
| 4,859,763 | 8/1989 | Takayanagai et al. | 528/357 |
| 5,041,529 | 8/1991 | Shinoda et al. | 528/354 |

FOREIGN PATENT DOCUMENTS

| | | |
|---|---|---|
| 59-148777 | 8/1984 | Japan . |
| 60-144325 | 7/1985 | Japan . |
| 62-270574 | 11/1987 | Japan . |
| 63-017929 | 1/1988 | Japan . |
| 1-146924 | 6/1989 | Japan . |

OTHER PUBLICATIONS

Japanese Industrial Standard, JIS K 0070-1992.

*Primary Examiner*—Samuel A. Acquah
*Attorney, Agent, or Firm*—Burns, Doane, Swecker & Mathis

[57] ABSTRACT

In the preparation of polyester by conducting ring-opening polymerization of a cyclic ester compound in the presence of a hydroxyl compound as a molecular weight regulator in the reaction system, the molecular weight of polyester can be accurately controlled in the desired range by previously estimating the amount of free carboxylic acid contained in the cyclic ester compound and controlling the amount of the hydroxyl compound on the basis of the estimated amount.

17 Claims, 2 Drawing Sheets

PREPARATION PROCESS OF POLYESTER

BACKGROUND OF THE INVENTION AND RELATED ART

1. Field of the Invention

The present invention relates to a preparation process of polyester by ring-opening polymerization of a cyclic ester compound. More particularly, the invention relates to a reproducible and consistent process for conducting ring-opening polymerization of a cyclic ester compound to prepare polyesters of a desired molecular weight which include polyhydroxycarboxylic acids such as polyglycolic acid, polylactic acid, polycaprolactone, polypropiolactone, polybutyrolactone and polyvalerolactone and copolymers thereof.

2. Related Art of the Invention

Polyesters including polyhydroxycarboxylic acids such as polyglycolic acid, polylactic acid, polycaprolactone, polypropiolactone polybutyrolactone and polyvalerolactone and copolymers thereof can be prepared by ring-opening polymerization of cyclic ester compounds such as lactide, glycolide and ε-caprolactone. These polyester can be decomposed with ease by water and enzyme and thus have been focused attention as biodegradable polymers.

Particularly, polylactic acid, polyglycolic acid and a lactic acid/glycolic acid copolyester which are prepared by ring-opening polymerization of lactide, glycolide and a mixture of these compounds, respectively, can be decomposed and absorbed with extreme ease in a living body. Consequently, these compounds are also referred to as bioabsorbable polymers and are used for medical materials such as surgical suture, matrix resin of slow release microspheric drugs and an absorbable plate for bonesetting. Further, in a field other than medical use, application to various formed materials such as films and sheets is under development. In any cases, it is desired to have satisfactory mechanical strength and hydrolyzability for respective used and thus required to maintain a certain level of mechanical strength for a prescribed period and thereafter to decompose quickly. In order to meet these characteristics, it is essentially important to limit the molecular weight of polyesters to a specific range, and additionally to restrict the copolymer composition to a certain range.

Various processes have been known for the preparation of cyclic ester compounds. As a general process, hydroxycarboxylic acid which corresponds to the desired cyclic ester compound is subjected to dehydration ring-closure. For example, lactide or glycolide is individually prepared by heating lactic acid or glycolic acid under reduced pressure to conduct dehydration condensation and by further heating the resultant lactic acid oligomer or glycolic acid oligomer to form a cyclic dimer through ring-closure. The cyclic ester compound thus obtained is usually purified by recrystallizing from a solvent such as ethyl acetate and used as a purified cyclic ester compound such as pure glycolide or pure lactide.

Preparation processes of polyesters such as polyglycolic acid, polylactic acid and a glycolic acid/lactic acid copolyester by ring-opening polymerization of these cyclic ester compounds have been described in, for example, Japanese Laid-Open Patent Sho 63-017929, U.S. Pat. Nos. 4,850,763 and 5,041,529. In these processes, ring-opening polymerization is carried out by heating glycolide and/or lactide in the presence of a stannous octoate catalyst and higher aliphatic alcohol such as lauryl alcohol or, hydroxycarboxylic acid such as lactic acid.

U.S. Pat. No. 3,442,871 has disclosed a preparation process of polyglycolic acid by polymerization of glycolide in the presence of prescribed amounts of a stannous chloride catalyst and an alcohol initiator (polymerization regulator) which is of from non-benzenoid unsaturation and free of reactive groups other than alcoholic hydroxyl group.

In the preparation of polyesters by ring-opening polymerization of cyclic ester compounds, regulation of the polyester molecular weight to a desired value has conventionally been considered very difficult. U.S. Pat. No. 3,442,887 above has described that the viscosity, that is, molecular weight of the polymer formed can be controlled by adjusting the amount of the initiator. However, the regulation of molecular weight (viscosity) in said patent merely means that, as seen in the examples, a low molecular weight polymer is formed by using a larger amount of the initiator and a high molecular weight polymer is formed in the presence of a smaller amount of the initiator. The results of these examples do not mean consistent production of polymers having a desired molecular weight.

According to the results of a careful trace conducted by the present inventors, several batches of the polymerization reaction under the same catalyst amount, the same initiator amount, the same reaction temperature and the same reaction time led to a significant dispersion on the molecular weight of polymers formed and some of the polymers caused difficulty in application to spinning and other processing. The fact that polymers having a constant molecular weight cannot be obtained means an impossibility of so-called targeting, that is, "preparation of polymers having an aimed molecular weight" which is a most important subject on the preparation of polymers in the invention.

Even though the catalyst amount, initiator amount, reaction temperature, reaction time and conversion rate are individually controlled under a certain condition, polymers having a constant molecular weight cannot be obtained because the polymerization reaction is greatly affected by the impurities contained in the cyclic ester monomer.

Impurities which give an adverse effect on the polymerization reaction include, for example, moisture, free carboxylic acids, metals and aldehydes. Impurities such as metals and aldehydes give a relatively small influence on the polymerization reaction and, as a result of recent advances in purification technique, can be reduced with ease to an amount which does not give an adverse effect on the polymerization reaction. Moisture contained in the monomer can also be removed with ease in the purification and drying step conducted immediately before polymerization. On the other hand, free carboxylic acid contained in the monomer gives a great influence on the polymerization reaction. Representative free carboxylic acids contained in the cyclic ester compound include hydroxycarboxylic acids used in the preparation of the cyclic ester compound, for example, lactic acid in the case of lactide and glycolic acid in the case of glycolide; straight chain oligomer of hydroxycarboxylic acid which is an intermediate product of the cyclic ester compound; and hydroxycarboxylic c acid formed from the cyclic ester compound as a result of hydrolysis due to some cause.

According to the information of the present inventors, it has been known that, in the preparation of polyester having a molecular weight of, for example, tens of thousands~hundreds of thousands, molecular weight of the formed polyester widely fluctuates in the presence of merely tens~100 ppm of free carboxylic acid. However, it is presently impossible to completely remove a free carboxylic acid from the monomer.

Various designs have conventionally been carried out in the preparation of the cyclic ester compounds. For example, Japanese Laid-Open Patent Sho 59-148777 has disclosed a purification process of glycolide which comprises heat-melting crude glycolide, dropwise adding the molten glycolide into an organic solvent maintained with stirring at a temperature of from 100° C. to less than the boiling point to form a glycolide suspension, successively cooling the suspension to 0°~20° C., and separating and drying pure glycolide.

Further, Japanese Laid-Open Patent Sho 62-270574 has disclosed a purification process of glycolide comprising dissolving glycolide in an organic solvent, adding alumina to the solution obtained, stirring the resultant slurry for 1~60 minutes, successively removing alumina by filtration and evaporating the solvent from the filtrate.

However, even though purification of glycolide is repeated several times according to these known processes, it is difficult to remove free carboxylic acid and other impurities to such an extent that these impurities give no adverse effect on the polymerization reaction. The extent of purification naturally leads to dispersion in the batch to batch amount of the impurities contained in the purified cyclic ester compounds. Further, in the case of readily hydrolyzable cyclic ester compounds such as lactide and glycolide in particular, even extremely purified compounds usually cause reduction of purity during storage because a free carboxylic acid such as a hydroxycarboxylic acid is formed as a result of hydrolysis by environmental moisture. Additionally, the amount of the hydroxycarboxylic acid generated during storage cannot be anticipated at all.

Consequently, when high molecular weight polyesters are prepared by ring-opening polymerization of the cyclic ester compounds, an unexpected dispersion is developed in the molecular weight of formed polyesters and leads to a serious problem on the production in industry. In order to prepare polyesters having a desired molecular weight, it is essentially important to measure immediately before use the amount of a free carboxylic acid such as a hydroxycarboxylic acid contained in the cyclic ester compounds which are raw material monomers.

However, it has not yet been known to accurately and simply estimate the amount of a free carboxylic acid contained in the readily hydrolyzable cyclic ester compounds in particular.

The amount of the free carboxylic acid contained in the cyclic ester compounds can be estimated in accordance with JIS K-0070, a method for testing an acid value or a hydroxyl value of chemical products. That is, the acid value is estimated by completely dissolving a sample in 100 cm$^3$ of an ether/ethyl alcohol mixture, containing phenolphthalein as an indicator and titrating the solution with a 0.1N potassium hydroxide solution in ethanol. The hydroxyl value is estimated by acetylating a sample with acetic anhydride and successively titrating the resulting solution with a 0.5N potassium hydroxide solution in ethanol, using phenolphthalein as an indicator.

These methods, however, are not suited for estimating trace quantities of free carboxylic acid contained in the readily hydrolyzable cyclic ester compounds. That is, the following problems are encountered in the acid value estimation.

(1) The cyclic ester compound is hydrolyzed by the moisture contained in the solvent for use in the estimation and the amount of free carboxylic acid increases with the lapse of time. Consequently, the quantity of titration cannot be constant.

(2) In order to estimate traces (about a few hundred ppm) of free carboxylic acid contained in the cyclic ester compounds, it is required to dissolve 10~20 g of a sample in a solvent. However, dissolving operation is difficult because solubility of the sample is low. Similarly to the above case, the cyclic ester compounds are liable to hydrolyze also in the course of hydroxyl value measurement and to cause transesterification with acetic anhydride. These side reactions inhibit accurate estimation.

Japanese Laid-Open Patent HEI 1-146924 has disclosed a preparation process of polymeric lactide comprising copolymerizing a meso-lactide monomer having a free acid content of less than 1 mg equivalent/kg lactide through a known method with another monomer or lactide having a free acid content of optionally less than 1 mg equivalent/kg. This invention describes the following quantitative analytical method for impurities in lactide.

The method is to dissolve lactide in anhydrous methanol and titrate with a 0.01N potassium methoxide solution in methanol by using phenolphthalein as an indicator. However, trace quantity of free carboxylic acid could not be measured by the method with good reproducibility because of the following reasons.

(1) The titrating solution of potassium methoxide in methanol having a high concentration of 0.01N cannot estimate free carboxylic acid equivalent to less than one drop of the titrating solution. For example, the difference between 100 ppm and 50 ppm of free carboxylic acid contents cannot be detected.

(2) On the other hand, a titrating solution having a low concentration develops merely a faint color of the indicator and the hue varies delicately. Consequently, the end point of titration is difficult to judge.

(3) Acids are generated by hydrolysis of the cyclic ester compounds due to traces of moisture contained in the solvent or atmosphere and measured values cause time dependent variation in the course of titrating operation.

Consequently, it is difficult to estimate traces of the free carboxylic acid with good reproducibility.

Japanese Patent Laid-Open Sho 60-144325 has described a preparation process of polyglycolic acid wherein glycolide having a melting point of 81° C. or more and APttA value of 150 or less after heat-melting at 200° C. for 3 minutes is selected for the raw material. The method can judge whether or not the glycolide to be used is suited for polymerization to obtain polyglycolic acid having an inherent viscosity of 0.9 dl/g or more. However, it is quite impossible to control the molecular weight of polyglycolic acid within the desired range by means of melting point and APHA value a lone.

Additionally, the present inventors prepared polylactic acid or polyglycolic acid by conducting ring-opening polymerization of lactide having a free acid content of 1 mg equivalent/kg or less or glycolide having a melting point of 81° C. or more and an APHA value of 150 or less. However, the molecular weight of polyester thus obtained still exhibited considerable dispersion for each batch and it is was difficult to obtain polyester having a molecular weight controlled within a prescribed range. Thus, the method was not always satisfactory.

As described above, the cyclic ester compounds are liable to undergo ring-opening by traces of moisture, though purified and stored under tight seal, and thus liable to generate new carboxylic acid. When free carboxylic acid is contained as impurities in the cyclic ester compounds even though in a trace amount, it becomes difficult to consistently prepare polyester having a desired molecular weight.

SUMMARY OF THE INVENTION

An object of the invention is to provide a preparation process of a polyester which can accurately control a molecular weight of the polyester within a desired range by ring-opening polymerization of a cyclic ester compound raw material which contains free carboxylic acid as impurities.

As a result of an intensive investigation in order to solve the above problem, the present inventors have found that the above object can be achieved by estimating with a specific method the amount of free carboxylic acid contained as impurities in a cyclic ester compound and fixing an amount of a hydroxyl compound to be added to the reaction system on the basis of the measured value. Thus the invention has been completed.

That is, the aspect of the invention is a preparation process of a polyester by adding a hydroxyl compound to a reaction system and conducting ring-opening polymerization of a cyclic ester compound, comprising fixing an amount of the hydroxyl compound to be added to the reaction system on the basis of the amount of free carboxylic acid contained in the cyclic ester compound.

The characteristic of the invention is to previously estimate the amount of free carboxylic acid contained as impurities in the cyclic ester compound raw material, and to fix the amount of the hydroxyl compound to be added to the reaction system on the basis of the measured value.

Another characteristic of the invention is to provide a preferred method for estimating an amount of the free acid in the cyclic ester compound by measuring electric conductivity of a solution of the cyclic ester compound.

By carrying out ring-opening polymerization of the cyclic ester compound according to the method having above characteristics, polyester having a molecular weight which is accurately controlled within a desired range can be consistently prepared even though the amount of the free carboxylic acid contained in the cyclic ester compound raw material is varied for each batch. As a result, polyester having small dispersion in the molecular weight can be always consistently prepared depending upon uses.

BRIEF DESCRIPTION OF THE DRAWING(S)

In the accompanying drawings:

FIG. 1 illustrates calibration curves used for estimating a free carboxylic acid content by measurement of $\Delta EC$ (a difference between an electric conductivity of a solution of a cyclic ester compound in a solvent and an electric conductivity of the solvent). (A) is a calibration curve for estimating a glycolic acid content, and (B) is a calibration curve for estimating a lactic acid content.

DETAILED DESCRIPTION OF PREFERRED EMBODIMENTS

Figure 1:
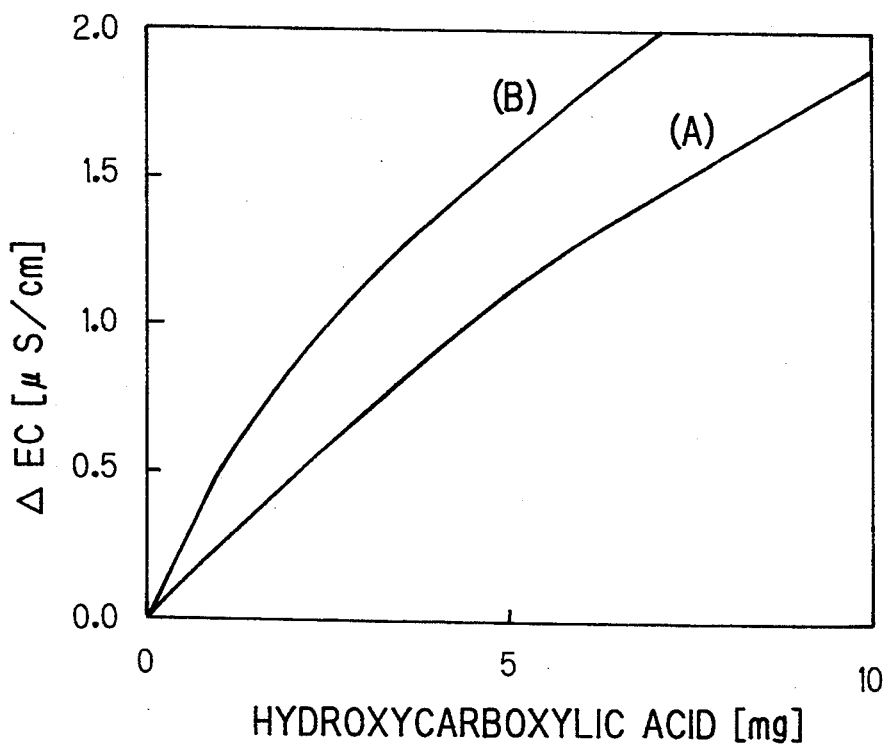

The present invention will hereinafter be illustrated in detail. Exemplary cyclic ester compounds which can be used as raw materials in the invention include glycolide, lactide, $\beta$-propiolactone, $\gamma$-butyrolactone, $\delta$-valerolactone, $\epsilon$-caprolactone, 3-methyl-1,4-dioxa-2,5-dione, p-dioxanone, morpholine-2,5-dione, morpholine-2-one and a mixture of these compounds. Glycolide and lactide are cyclic dimers of glycolic acid and lactic acid, respectively, and are prepared by conducting dehydration condensation of these hydroxycarboxylic acids and successively subjecting the resulting condensate to a ring closing reaction. Lactide is classified into D-lactide which is a cyclic dimer of D-lactic acid, L-lactide which is a cyclic dinner of L-lactide, mesolactide which is obtained by cyclic dimerization of D-lactic acid and L-lactic acid, and DL-lactide which is a racemic mixture of D-lactide and L-lactide. Any of these lactides can be used for the raw material of the invention.

The cyclic ester compound used for the invention is preferably purified by recrystallizing from a solvent such as ethyl acetate. The cyclic ester compound used in the invention is preferably dehydrated as much as possible before subjecting to the polymerization reaction. When the moisture content is high, molecular weight control of polyester is liable to be difficult. Consequently, moisture content of the cyclic ester compound is preferably 0.5% by weight or less, more preferably 1,000 ppm by weight or less. In order to accurately control the molecular weight of polyester having a molecular weight of 100,000 or more in particular, moisture content of the cyclic ester compound is preferably 100 ppm by weight or less. The moisture can be removed from the cyclic ester compound by known processes such as deairing or heat drying.

Catalysts are preferably used in the invention. Catalysts which can be used include, for example, tin chloride, tin oxide, tin fluoride, tetraphenyltin, stannous octoate, tin acetate, tin stearate and other tin compounds, zinc oxide, antimony trioxide, antimony trifluoride, bismuth nitrate, lead oxide, lead stearate, boron trifluoride, tetraethyl ammonium bromide, triethylamine, tributylamine tributylstibine, tributylarsine, tributylphosphine and the similar compounds. A preferred catalyst is stannous octoate which is approved by FDA in USA as a nontoxic stabilizer. The amount of a catalyst used varies depending upon kind of the cyclic ester compound, temperature of ring-opening polymerization, desired reaction time and conversion rate. The amount is usually 0.001~0.5% by weight for the cyclic ester compound when the ring-opening polymerization of the cyclic ester compound is carried out in a temperature range of 80°~280° C.

The hydroxyl compounds used in the invention refer to compounds having a hydroxyl group in the molecular structure, and include, for example, alcohols, hydroxycarboxylic acids and saccharides.

Exemplary alcohols includes methanol, ethanol, propanol, butanol, pentanol, amyl alcohol, capryl alcohol, nonyl alcohol, decyl alcohol, undecyl alcohol, lauryl alcohol, tridecyl alcohol, myristyl alcohol, pentadecyl alcohol, cetyl alcohol, heptadecyl alcohol, stearyl alcohol, nonadecyl alcohol and other aliphatic saturated alcohols, cyclopentanol, cyclohexanol, cycloheptanol, cyclooctanol and other alicyclic alcohols; unsaturated alcohols; and diols, triols and other polyols. Preferred alcohols are monohydric straight chain aliphatic saturated alcohols having 12-18 carbon atoms, and include, for example, lauryl alcohol, myristyl alcohol, cetyl alcohol and stearyl alcohol. Lauryl alcohol is most preferably used.

Representative hydroxycarboxylic acids include, for example, glycolic acid, lactic acid, hydroxypropanoic acid, hydroxycaproic acid and linear oligomers of these acids. Linear oligomers composed of 2-10 monomer units are usually used. Preferred hydroxycarboxylic acids are glycolic acid and lactic acid.

Exemplary saccharities which can be used include glucose, mannose, allose, altrose, talose, arabinose, ribose, xylose, erythrose, fructose, glycerose and other monosaccharides; sucrose, cellobiose, dextrin, cyclodextrin, raffinose and other oligosaccharides; amylose, dextran, starch, pullran, cellulose, galactan and other polysaccharides; deoxyribose and other deoxysaccharides, glucosamine and other aminosaccharides; thioglucose and other thiosaccharides; streptose and other branched saccharides; uronic acid and other acid saccharides; and polyuronic acids, phosphated polysaccharides, mucopolysaccharides, heteropolysaccharides, methylglucoside, digitalis, nucleotide, nucleoside and other glycosides. Polysaccharides and glycosides are preferably used in these saccharides.

The invention can control the molecular weight of polyester obtained within a desired range by estimating with a below described method the amount of free carboxylic acid contained as impurities in the cyclic ester compound raw material, and by fixing the amount of the hydroxyl compound to be added to the reaction system on the basis of the measured value.

An example of the controlling method will be illustrated follows. When preparation of polyester having a molecular weight Ma is aimed and a cyclic ester compound containing Ka moles of free carboxylic acid is subjected to ring-opening polymerization by addition of Ha moles of hydroxyl compound to the reaction system under a certain other polymerization conditions, polyester obtained has a molecular weight Mb (Mb<Ma). The molecular weight Mb of the resulting polyester is lower than the molecular weight Ma of the aimed polyester by (Ma−Mb). The molecular weight difference (Ma−Mb) is resulted from Ka moles of the free carboxylic acid contained in the cyclic ester compound raw material.

Consequently, in the process of the invention, the amount Ka moles of free carboxylic acid contained in the cyclic ester compound raw material is previously estimated with a specific method described below, the free carboxylic acid content Ka moles thus obtained is converted to the amount Hb moles of the hydroxyl compound, and the amount of hydroxyl compound to be added to the reaction system is fixed on (Ha−Hb) moles. Such adjustment enables consistent preparation of polyester having the aimed molecular weight Ma.

The amount of the hydroxyl compound to be added to the reaction system in the invention is fixed on the basis of the content of free carboxylic acid in the cyclic ester compound raw material, and thus Ha and Hb above must be in a relationship Ha≧Hb.

In view of such relationship, the cyclic ester compound having higher purity is more preferably used in the invention, that is, a lower content of free carboxylic acid is more preferred.

For example, the cyclic ester compound containing 100 meq/kg or less of free carboxylic acid is preferably used for the raw material when the aimed molecular weight of polyester is 100,000 or less. A free carboxylic acid content of 50 meq/kg or less is preferred when the aimed molecular weight is 100,000~200,000. A free carboxylic acid content of 30 meq/kg or less is preferred when the aimed molecular weight is 200,000 or more.

By thus fixing the amount of the hydroxyl compound to be added to the reaction system on the basis of the amount of free carboxylic acid contained in the cyclic ester compound raw material, the molecular weight of resultant polyester can be accurately controlled. The accuracy for controlling the molecular weight of polyester varies depending upon kind of polyester, dryness of the monomer, and polymerization conditions. For example, the molecular weight of polyester can be controlled within the range of ±1000 when the desired molecular weight is about 30,000, within the range of ±2500 when the desired molecular weight is about 100,000. When polyester is polyglycolic acid or polylactic acid in particular, the molecular weight which is indicated with an inherent viscosity of polyester can be controlled within the range of ±0.02 dl/g for the aimed inherent viscosity. The amount of the hydroxyl compound added to the reaction system of the invention is suitably selected in the range of 0.01-10% by mole for the cyclic ester compound on the basis of the amount of free carboxylic acid contained in the cyclic ester compound. For example, when the desired molecular weight of polyester is 50,000~300,000, the amount of hydroxyl compound added to the reaction system is selected in the range of 0.01~0.5% by mole for the cyclic ester compound.

A range of the molecular weight Mw of the polyester prepared by the present invention is not limited and the preparation process can be applied to polyesters having a molecular weight range of 10,000~1,000,000. The preferable range is 30,000~500,000 and more preferably 50,000~300,000.

Next, the method for estimating the amount of free carboxylic acid contained as impurities in the cyclic ester compound will be illustrated.

A method which can be preferably used for the quantitative analysis of free carboxylic acid in the invention is to measure electric conductivity of a solution containing the cyclic ester compound in a mixture of a hydrophilic organic solvent and water (hereinafter referred to as a cyclic ester compound solution) and to estimate the amount of free carboxylic acid on the basis of the measured value.

In the above quantitative analysis, the term hydrophilic organic solvent refers to organic solvents which can dissolve 1% by weight or more of water, and includes, for example, methanol, ethanol, 1-propanol, 2-propanol, 1-butanol, 2-butanol, tert-butanol, and other monohydric alcohols; ethylene glycol, propylene glycol and other diols; glycerol and other polyols; acetone, methyl ethyl ketone and other ketones; ethyl acetate and other esters; dioxane, tetrahydrofuran and other cyclic ethers; and mixtures of these solvents. The organic solvents also include water soluble oligomers and polymers such as polypropylene glycol and polyethylene glycol which can be liquid at room temperature to 80° C.

The hydrophilic organic solvent used in the invention is not always required to dissolve the cyclic ester compound in a high concentration, but it is preferred to dissolve the compound with ease. The hydrophilic organic solvents which can be preferably used in the invention are methanol, ethanol, dioxane, acetone and methyl ethyl ketone. When the quantitative analysis of free carboxylic acid is applied to glycolide or lactide, methanol or ethanol is preferably used in view of solubility of the cyclic ester compound and ease of measurement on electric conductivity.

The amount of water to be mixed with the hydrophilic organic solvent is preferably $1 \sim 50$ parts by weight for 100 parts by weight of the hydrophilic organic solvent.

When a large amount of water is used, conversion velocity from the cyclic ester compound to the hydroxycarboxylic acid by hydrolysis is increased and it becomes difficult to precisely estimate the amount of free carboxylic acid which is originally present in the cyclic ester compound. On the other hand, a small amount of water leads to insufficient electric conduction of the solvent and sensitivity for estimating free carboxylic acid is unfavorably decreased. In view of these circumstances, the proportion for mixing the hydrophilic organic solvent with water is preferably in the above range.

Composition of the solvent mixture is preferably varied depending upon kind of the cyclic ester compound. For example, when the cyclic ester compound is glycolide, the amount of water is preferably $1 \sim 25$ parts by weight, more preferably $3 \sim 15$ parts by weight for 100 parts by weight of the hydrophilic organic solvent. In the case of lactide, the amount of water is preferably $1 \sim 40$ parts by weight, more preferably $3 \sim 30$ parts by weight for 100 parts by weight of the hydrophilic organic solvent. In the case of $\epsilon$-caprolactone, the preferred amount of water is $1 \sim 50$ parts by weight.

When the mixture of the hydrophilic organic solvent with water has high electric conductivity, it becomes difficult to accurately estimate traces of free carboxylic acid. Consequently, the electric conductivity of the solvent mixture prior to dissolving the cyclic ester compound is preferably less than 50 $\mu$S/cm, more preferably less than 10 $\mu$S/cm. In order to prepare a mixture of the hydrophilic organic solvent with water having electric conductivity of less than 10 $\mu$S/cm, both of the hydrophilic organic solvent and water to be used preferably have as high purity as possible. Particularly, impurities such as acid and alkali increase electric conductivity and thus it is preferred to previously eliminate these impurities by distillation, ion exchange and other known processes.

When a small amount of the cyclic ester compound is dissolved in the mixture of the hydrophilic organic solvent and water, a high purity sample, that is, a sample having a low content of free carboxylic acid makes the free carboxylic acid concentration lower than the detection limit by electric conductivity or tends to lower accuracy of measurement. On the other hand, a large amount of the cyclic ester compound leads to difficulty on dissolution in the solvent mixture and quantitative analysis of the free carboxylic acid. In view of these circumstances, the amount of the cyclic ester compound dissolved in the mixture of a hydrophilic organic solvent with water is preferably in the range of $0.1 \sim 20$ parts by weight for 100 parts by weight of the solvent mixture. Particularly in the case of glycolide or lactide, the amount of the cyclic ester compound is preferably $0.5 \sim 10$ parts by weight, more particularly $1 \sim 8$ parts by weight.

Electric conductivity measurement is preferably carried out while suitably stirring the solution of the cyclic ester compound. The free carboxylic acid in the cyclic ester compound can be effectively diffused by stirring into the solution and precise estimation can be wade possible.

Temperature of the solution during electric conductivity measurement relates to accuracy of estimation. That is, low temperature of the solution inhibits precise quantitative analysis because the cyclic ester compound is difficult to dissolve in the mixture of the hydrophilic organic solvent with water or electric conductivity itself is too low to carry out precise measurement. On the other hand, high temperature of the solution leads to hydrolysis of the cyclic ester compound and evaporation or boiling of the solvent mixture and thus results in time dependent variation in the proportion of the organic solvent and water. In view of these circumstances, the temperature of the solution during electric conductivity measurement is generally $0° \sim 80°$ C., preferably $10° \sim 40°$ C., more preferably 25° C. Measuring temperature can be suitably selected from the above range. However, measurement is preferably carried out at a constant temperature.

No particular restriction is imposed upon the model and shape of the instrument for measuring electric conductivity. A known instrument can be used and includes, for example. Electric Conductivity Meter, Model DS-15 (manufactured by HIRATA Co.).

When the cyclic ester compound is poured into the solvent mixture, free carboxylic acid contained in the cyclic ester compound is diffused by dissolving in the solvent and thus electric conductivity of the cyclic ester compound varies instantaneously. Consequently, the amount of free carboxylic acid contained in the cyclic ester compound can be estimated from difference of electric conductivity between before and after pouring the cyclic ester compound by using a calibration curve which indicates previously examined relationships between the amount of free carboxylic acid and electric conductivity.

However, when the cyclic ester compound to be verified has readily hydrolyzable property like glycolide and lactide, the cyclic ester compound itself is hydrolyzed by moisture contained in the hydrophilic organic solvent and thus electric conductivity increases gradually in the course of measurement.

Consequently, in the case of estimating the amount of free carboxylic acid in the readily hydrolyzable cyclic ester compound, electric conductivity of the solution is measured and recorded every prescribed time, preferably every 30 seconds, for a minute or more, preferably for 3 minutes or more, from immediately after pouring the cyclic ester compound into the water containing hydrophilic organic solvent. A graph is prepared, with electric conductivity at each measuring time as ordinate and time from the pouring of the cyclic ester compound as abscissa. The electric conductivity increases almost linearly from one to several minutes after pouring. The linear portion of the curve is extrapolated to zero time, that is, the intersection of the lineal extention with zero time ordinate is observed. The electric conductivity of the sample is a value obtained by subtracting from the observed value the electric conductivity value at the immediately before pouring of the cyclic ester compound. The content of free carboxylic acid can be obtained from the electric conductivity of the sample by using the previously prepared calibration curve.

In the case of estimating the amount of free carboxylic acid, it is not always required to examine the absolute amount of free carboxylic acid by using the calibration curve as above. Variation of electric conductivity is previously examined on the cyclic ester compounds to be used as reference, that is, the reference samples, according to the method of the invention. Variation of electric conductivity is similarly examined on a cyclic ester compound having an unknown content of free carboxylic acid. The unknown content can be relatively estimated by comparing these electric conductivities.

EXAMPLES

The present invention will hereinafter by illustrated further in detail by way of examples and comparative examples. Molecular weight, degree of conversion, electric conductivity and amount of free carboxylic acid in these examples were measured by the methods described below. Examples for preparing polyesters having aimed molecular weights of 170,000, 185,000, 123,000, and 75,000 will be illustrated. However, these examples are not to be constructed to limit the scope of the invention.

(1) Molecular weight of polyester

A weight average molecular weight (hereinafter referred to as Mw) of polyester was measured by gel permeation chromatography (hereinafter referred to as GPC) using 1,1,1,3,3,3-hexafluoro-2-propanol (hereinafter referred to as HFP) as a solvent. Polymethyl methacrylate (PMMA) was used as reference of Mw.

(2) Degree of conversion (rate of polymerization) in polymerization reaction.

Conversion degree was determined by dissolving the resulting polymer in HFP and measuring the amount of residual monomer through gas chromatography (GC).

(3) Electric conductivity and free carboxylic acid.

A methanol/water solvent mixture was prepared by mixing 100 parts by weight of methanol (guaranteed reagent) with 5~20 parts by weight of deionized water having electric conductivity of 0.5 $\mu$s/cm or less. The solvent mixture was collected in an amount of 100 parts by weight and the temperature was controlled to 25° C. To the above solvent mixture 2~10 parts by weight of the cyclic ester compound was poured at 25° C. with stirring and dissolved to prepare a water/methanol solution of the cyclic ester compound, conductivity meter Model DS-15 (manufactured by HIRATA Co.) was used for measuring conductivity.

From immediately after the pouring of the cyclic ester compound, electric conductivity of the water/methanol solution of the cyclic ester compound was measured at 25 ° C. for each 30 seconds. The values of electric conductivity obtained immediately before the pouring of the cyclic ester compound was subtracted from the above measured values. The values of $\Delta EC$ were thus obtained. A curve was plotted with the values of $\Delta EC$ as ordinate and with the measuring times as abscissa. A lineal portion of the curve thus obtained was extrapolated to zero time to give a value $\Delta EC_0$. The amount of free carboxylic acid contained in the cyclic ester compound was obtained from the value $\Delta EC_0$ on the basis of a separately prepared calibration curve. The amount of hydroxyl compound to be added to the reaction system was fixed on the basis of the obtained amount of free carboxylic acid.

(4) Preparation of calibration curve A

A standard solution of glycolic acid was prepared by diluting 2 cm$^3$ of a 70% by weight aqueous glycolic acid solution (guaranteed reagent) to 25 cm$^3$ with a solvent mixture composed of 79.6 parts by weight of methanol and 8 parts of water.

Separately, a solvent mixture was prepared by mixing 79.6 g of methanol and 8 g of distilled water in a 200 cm$^3$ tall beaker. To the latter solvent mixture, 2 mm$^3$ of the standard solution of glycolic acid (0.14 mg as glycolic acid) which was obtained as above was added to prepare a diluted solution of glycolic acid. Electric conductivity of the diluted solution and the solvent mixture were measured with the above conductivity meter. A value $\Delta EC$ 1 was obtained by subtracting the latter conductivity from the former conductivity. Further, the procedure for progressively adding 2 mm$^3$ each of the standard glycolic acid solution to the diluted solution was repeated and the value $\Delta EC$ 1 was measured in a respective step.

The calibration curve A was obtained by plotting on a graph the relationship between the added amounts of glycolic acid and the values of $\Delta EC1$. The calibration curve A thus obtained is illustrated in FIG. 1.

(5) Preparation of calibration curve B

A standard solution of lactic acid was prepared by diluting 2 cm$^3$ of a 90% by weight aqueous L-lactic acid solution (guaranteed reagent) to 25 cm$^3$ with a solvent mixture composed of 80 g of methanol and 15 g of water. Separately, a solvent mixture was prepared by mixing 80 g of methanol and 15 g of distilled water in a 200 cm$^3$ tall beaker. To the latter solvent mixture, 2 mm$^3$ of the standard lactic acid solution (0.16 mg as lactic acid) which was obtained as above was added to prepare a diluted solution of lactic acid. Electric conductivity of the diluted solution and the solvent mixture were measured with the above conductivity meter. A value $\Delta EC2$ was obtained by subtracting the latter conductivity from the former conductivity. Further, the procedure for progressively adding 2 mm$^3$ of the standard lactic acid solution to the diluted solution was repeated and the value of $\Delta EC2$ was measured in a respective step. The calibration curve B was obtained by plotting on a graph the relationship between the added amounts of lactic acid and the values of $\Delta EC2$. The calibration curve B thus obtained is illustrated in FIG. 1.

EXAMPLE 1

Figure 2:
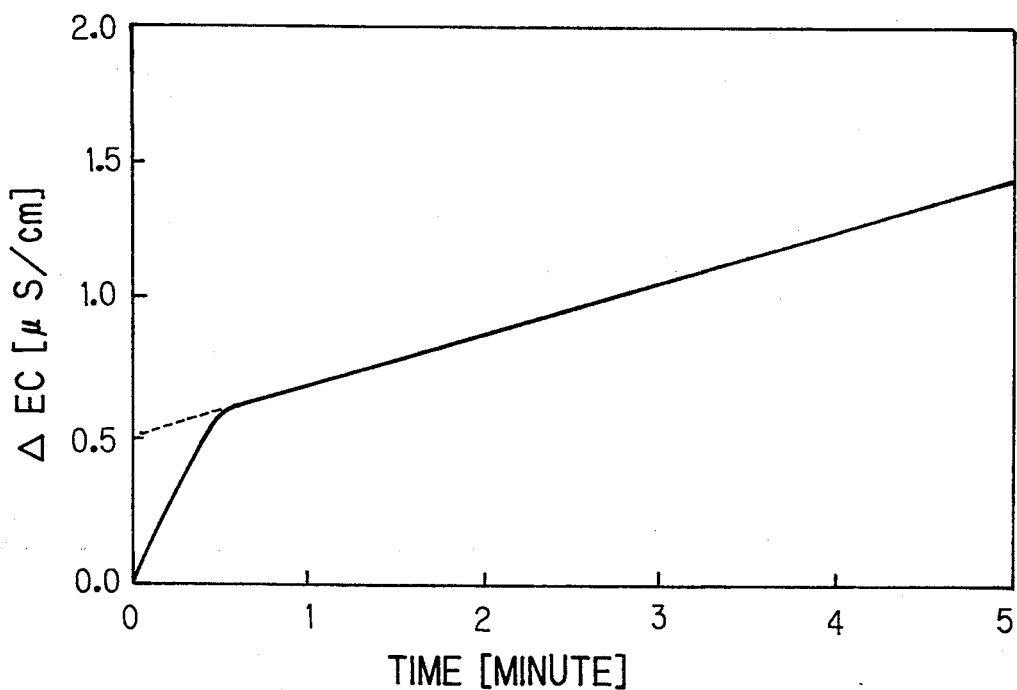
FIG. 2 illustrates a time-dependent variation on a diffrence $\Delta EC$ between an electric conductivity of a solution obtained by dissolving glycolide of Example 1 in a solvent mixture of water and methanol and an elecctric conductivity of the solvent mixture itself.

A methanol/water solvent mixture was prepared by mixing 79.6 g of methanol (guaranteed reagent) with 8.0 g of deionized water having an electric conductivity of 0.5 $\mu$s/cm or less. The solvent mixture was controlled the temperature to 25° C., and electric conductivity of the previously measured. To the solvent mixture, 3.0 g of mixture was marketed glycolide (G-1) was added and time dependent variation of electric conductivity was measured at 25° C. on the glycolide solution in the methanol/water solvent mixture according to the above method (3) The difference ΔEC between the measured value and the previously measured electric conductivity of the solvent mixture was calculated and plotted to obtain a curve illustrated in FIG. 2. The linear portion of the curve was extrapolated to zero time. The extrapolated value was 0.50 μs/cm. Additionally, electric conductivity measurement was further repeated twice under the same conditions as above by using 3.0 g of glycolide (G-1) which was the same lot. As a result, both time dependant variations of ΔEC were almost the same as the first run and the curves illustrating the measured time ΔEC relations were almost overlapped with the curve in FIG. 2, which exhibited very good reproducibility. Any of the value obtained by extrapolating individual linear portion of the curves to zero time was 0.50 μS/cm. The amount of free carboxylic acid contained in glycolide was obtained from the value $\Delta EC_0$ on the basis of the calibration curve in FIG. 1.

The amount was 683 ppm, that is, 8.98 meq/kg as converted to glycolic acid.

In order to prepare polyglycolic acid having a molecular weight of 170,000, the amount of a hydroxyl compound (lauryl alcohol) to be added to the reaction system was calculated from the Equation 1 below:

$$A \times f + L = B \qquad (\text{Eq. 1})$$

wherein f is an amount (meq/kg) of free carboxylic acid estimated by measuring electric conductivity, L is the amount (meq/kg) of lauryl alcohol to be added to the reaction system, and A and B are constants determined by the aimed molecular weight of polyester. As a result, the amount of a hydroxyl compound (lauryl alcohol) to be added to the reaction system was 18.2 meq/kg. that is, 0.339% by weight.

Equation 1 above illustrates relationships between the amount of free carboxylic acid in the cyclic ester compound and the amount of the hydroxyl compound (a molecular weight regulator) to be added to the reaction system in the preparation of polyester having an aimed molecular weight by polymerizing the cyclic ester compound under a certain condition. The equation is an empirical formula derived from dozens batches of polymerization carried out by the present inventors.

A and B depend upon the kind of the cyclic ester compound, aimed molecular weight of polyester and reaction conditions such as kind and amount of the catalyst and molecular weight regulator, moisture content of the monomer, reaction temperature, react ion time, degree of conversion and scale of the reactor. In the case of preparing polyglycolic acid having an aimed molecular weight of 170,000 under the reaction conditions illustrated in Example 1, where A is 0. 386, and B i s 21.7.

To a 5,000 cm³ stainless steel reaction vessel equipped with a stirrer and temperature regulator, 3,000 g of glycolide (G-1) and 10 cm³ of a toluene solution containing 0.30 g of stannous octoate were charged and deaerated at 100° C. for an hour under reduced pressure of 1~5 mmHg.

After deaeration, the interior of the reaction vessel was replaced with nitrogen and lauryl alcohol was added in an amount of 0.339% by weight for glycolide. The temperature of the reaction mixture was increased from 100° C. to 235° C. in a nitrogen atmosphere. A ring-opening polymerization was carried out at 235° C. for an hour to obtain polyglycolic acid. The degree of conversion (polymer yield) was 98%. The weight average molecular weight Mw of polyglycolic acid was 172,000. Polyglycolic acid having an almost aimed molecular weight could be obtained.

Table 1 illustrates the melting point of glycolide used, Hazen color number (APHA value) after heat melting glycolide at 200° C. in accordance with a method disclosed in Japanese Patent Publication HEI 3-44566, electric conductivity of the glycolide solution, amount of free carboxylic acid in glycolide, amount of lauryl alcohol added, and aimed and obtained weight average molecular weights (MW) of polyglycolic acid.

EXAMPLE 2

The remainder of the glycolide lot (G-1) was sealed in a pack made of an aluminum laminated film and kept for a month at ordinary temperature. Thereafter the pack was opened and the value $\Delta EC_0$ was measured by using a methanol/water solvent mixture having a component ratio of 79.6:8.0 by weight as carried out in Example 1. The value $\Delta EC_0$ was 1.10 μS/cm. The amount of free carboxylic acid contained in glycolide was obtained from the value $\Delta EC_0$ on the basis of the calibration curve A in FIG. 1. The amount was 1610 ppm, that is, 20.6 meq/kg as converted to glycolic acid. The amount of free carboxylic acid was thought to increase during storage by hydrolysis of glycolide due to traces of moisture.

The amount of free carboxylic acid was thought to increase during storage by hydrolysis of glycolide due to traces of moisture.

The amount of lauryl alcohol to be added to the reaction system in order to prepare polyglycolic acid having a molecular weight of 170,000 was calculated from the above Eq. 1 and fixed on 13.7 meq/kg, that is, 0.255% by weight for glycolide.

Polyglycolic acid was prepared by carrying out ring-opening polymerization of glycolide under the same reaction conditions as Example 1 except that 0.255% by weight of lauryl alcohol was added to glycolide. The degree of conversion (polymer yield) was 98%. Polyglycolic acid had a weight average molecular weight of 171,000 which was measured by the above method and was almost equal to the aimed molecular weight. Results are illustrated in Table 1.

COMPARATIVE EXAMPLE 1

The remainder of the glycolide lot (G-1) was sealed in a pack made of an aluminum laminated film and kept for a month at ordinary temperature. Thereafter the pack was opened and polyglycolic acid was prepared by adding the same amount (0.339% by weight) of lauryl alcohol as Example 1 to the reaction system and carrying out ring-opening polymerization under the same conditions as Example 1. The degree of conversion was 99%. Polyglycolic acid had a weight average molecular weight of 143,000 which was measured by the above method and was considerably lower than the aimed molecular weight. Results are illustrated in Table 1.

EXAMPLE 3

Glycolide (G-2) which was different from the lot used in Example 1 was dissolved in a methanol/water solvent mixture having a component ratio of 79.6:8.0 by weight and electric conductivity was measured by the same procedures as Example 1. The value $\Delta EC_0$, was 0.12 μS/cm. The amount of free carboxylic acid contained in glycolide was obtained from the value $\Delta EC_0$ on the basis of the calibration curse A in FIG. 1. The amount was 150 ppm, that is, 1.97 meq/kg as converted to glycolic acid.

In order to prepare polyglycolic acid having a molecular weight of 170,000, the amount of lauryl alcohol to be added to the reaction system was calculated from the above Eq. 1 and fixed on 20.9 meq/kg, that is, 0.389% by weight for glycolide.

Polyglycolic acid was prepared by carrying out ring-opening polymerization of glycolide under the same reaction conditions as Example 1 except that lauryl alcohol added was 0.389% by weight for glycolide. The degree of conversion (polymer yield) was 98%.

Polyglycolic acid thus obtained had Mw of 169,000 which was measured by the above method and was almost equal to the aimed molecular weight. Results are illustrated in Table 1.

COMPARATIVE EXAMPLE 2

The same lot (G-2) of glycolide as used in Example 3 was subjected to ring-opening polymerization under the same conditions as Example 1 by adding the same amount (0.339% by weight) of lauryl alcohol as Example 1 without estimating the amount of free carboxylic acid. Polyglycolic acid thus obtained had a degree of conversion (polymer yield) of 98%. The weight average molecular weight of polyglycolic acid which was measured by the above method was 196,000 which was higher than the aimed molecular weight. Results are illustrated in Table 1.

TABLE 1

| | Example | | | Comparative Example | |
|---|---|---|---|---|---|
| | 1 | 2 | 3 | 1 | 2 |
| Lot No. | G-1 | G-1 | G-2 | G-1 | G-2 |
| Melting point (°C.) | 82.5 | 82.1 | 82.5 | 82.1 | 82.5 |
| APHA | 100 or less | 100 or less | 100 or less | 100 or less | 100 or less |
| $\Delta EC_0$ ($\mu$S/cm) | 0.50 | 1.10 | 0.12 | no measurement | |
| Free carboxylic acid content (meq/kg) | 8.98 | 20.61 | 1.97 | — | — |
| Lauryl alcohol amount (% by weight) | 0.339 | 0.255 | 0.389 | 0.339 | 0.339 |
| Aimed Mw | 170000 | 170000 | 170000 | 170000 | 170000 |
| Polyglycolic acid Mw | 172000 | 171000 | 169000 | 143000 | 196000 |

EXAMPLE 4

Figure 3:
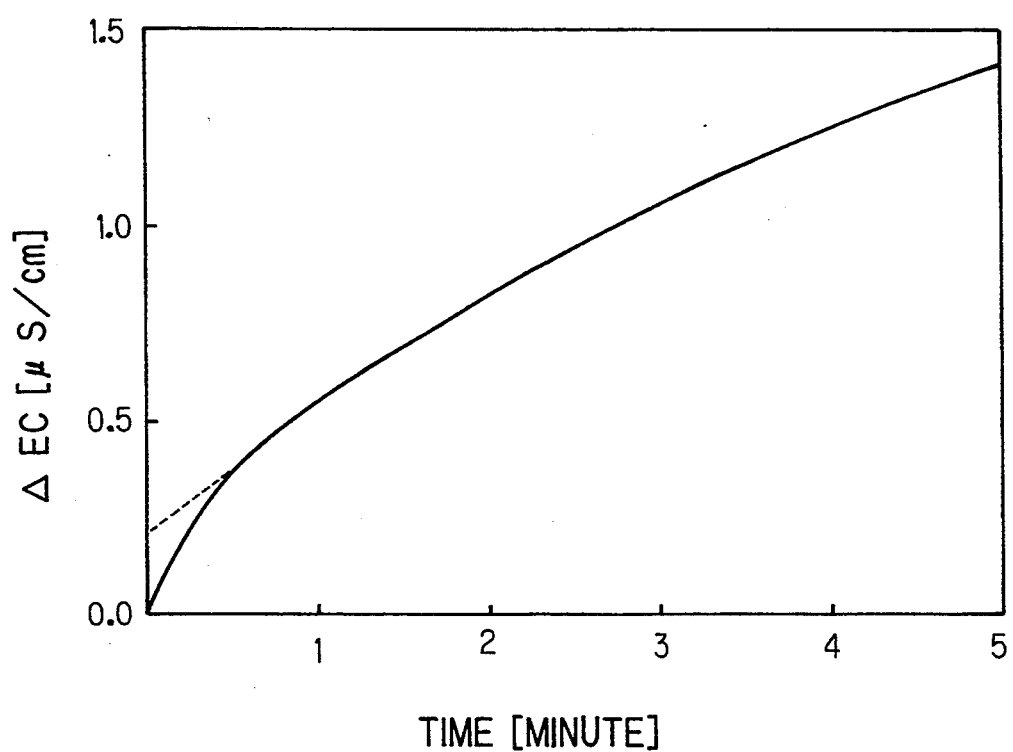
FIG. 3 illustrates a time-dependent variation on a diffrence $\Delta EC$ between an electric conductivity of a solution obtained by dissolving lactide of Example 4 in a solvent mixture of water and methanol and an electric conductivity of the solvent mixture.

A methanol/water solvent mixture was prepared by mixing 80.0 g of methanol (guaranteed reagent) with 15.0 g of deionized water having an electric conductivity of 0.5 $\mu$s/cm or less. The solvent mixture was controlled the temperature to 25° C., and electric conductivity of the mixture was previously measured. To the solvent mixture, 4.0 g of marketed L-lactide (L-1) was added and time dependent variation of electric conductivity was measured at 25° C. on the lactide solution in the methanol/water solvent mixture by the same procedures as Example 1. The difference $\Delta EC$ between the measured value and the previously measured electric conductivity of the solvent mixture was calculated and plotted to obtain a curve illustrated in FIG. 3.

The linear portion of the curve was extrapolated to zero time. The extrapolated value was 0.22 $\mu$S/cm. The amount of free carboxylic acid in lactide was obtained on the basis of the calibration curve B in FIG. 1. The amount was 120 ppm, that is, 1.33 meq/kg as converted to lactic acid.

In order to prepare polylactic acid having a molecular weight of 185,000 on the basis of the obtained amount of free carboxylic acid, the amount of lauryl alcohol to be added to the reaction system was calculated from an empirical formula which is similar to the above Eq. 1 and has different constants and fixed on 29.7 meq/kg, that is, 0.553% by weight for lactide.

To a 1,000 cm³ stainless steel reaction vessel equipped with a stirrer and temperature regulator, 200 g of L-lactide and 2 cm³ of a stannous octoate solution in toluene having a concentration of 0.15 g/10 cm³ solvent were charged and deaerated at 110° C. for an hour under reduced pressure of 1~5 mmHg. After deaeration, the interior of the reaction vessel was replaced with nitrogen and lauryl alcohol was added in an amount of 0.553% by weight for- L-lactide.

The mixture was heated at 180° C. for 2 hours in a nitrogen atmosphere to obtain polylactic acid. The conversion was 97%. Polylactic acid obtained had a weight average molecular weight of 185,000. Polylactic acid having an aimed molecular weight could be obtained. The polymer was dissolved in chloroform into a concentration of 0.5 g/100 cm³ and measured an inherent viscosity $\eta$ at 25° C. with an Ubbellohde viscometer. The inherent viscosity was 1.32 dl/g (132 cm³/g). Table 2 illustrates the above $\Delta EC_0$ of the lactide solution, added amount of lauryl alcohol, and aimed and obtained weight average molecular weight of polylactic acid.

EXAMPLE 5

L-lactide (L-2) which was different from the lot used in Example 4 was dissolved in a methanol/water solvent mixture having a component ratio of 80:15 by weight and electric conductivity was measured by the same procedures as Example 4. The value $\Delta EC_0$ was 1.38 $\mu$S/cm. The amount of free carboxylic acid contained in lactide was obtained from the value $\Delta EC_0$ on the basis of calibration curve B in FIG. 1. The amount was 1020 ppm, that is, 11.32 meq/kg as converted to lactic acid.

In order to prepared polylactic acid having a molecular weight of 185,000, the amount of lauryl alcohol to be added to the reaction system was calculated from an empirical formula similar to example 4 and fixed on 25.2 meq/kg, that is, 0.469% by weight for lactide.

Polylactic acid was prepared by carrying out ring-opening polymerization of lactide under the same reaction conditions as Example 4 except that lauryl alcohol added was 0.469% by weight for lactide. The degree of conversion (polymer yield) was 98%. Polylactic acid obtained had Mw of 183,000 which was measured by the above method and was almost equal to the aimed molecular weight. Results are illustrated in Table 2.

COMPARATIVE EXAMPLE 3

The same lot (L-2) of L-lactide as used in Example 5 was subjected to ring-opening polymerization in order to prepare polylactic acid having a molecular weight of 185,000 under the same conditions as Example 4 by adding the same amount (0.553% by weight) of lauryl alcohol as Example 4 without estimating the amount of free carboxylic acid. Polylactic acid thus obtained had a degree of conversion (polymer yield) of 98%. The weight average molecular weight of polylactic acid which was measured by the above method was 164,000 which was lower than the aimed molecular weight. Results are illustrated in Table 2.

COMPARATIVE EXAMPLE 4

L-lactide (L-3) which was different from the lot used in Example 4 was dissolved in a methanol/water solvent mixture having a component ratio of 80:15 by weight, and electric conductivity of the solution was measured. The value $\Delta EC_0$ at zero time obtained. The amount of free carboxylic acid contained in lactide was obtained from the value $\Delta EC_0$ on the basis of the calibration curve. The amount was 13.1% by weight, that is, 1,450 meq/kg.

This lot of lactide contained too much amount of free carboxylic acid and thus it was impossible to control the molecular weight of polyester by addition of lauryl alcohol. The lot of lactide was subjected to ring-opening polymerization under the same reaction conditions as Example 4 in the absence of lauryl alcohol. Polylactic acid thus obtained had an extremely low molecular weight and the weight average molecular weight was 6,000.

Results are illustrated in Table 2.

TABLE 2

|  | Example | | Comparative Example | |
|---|---|---|---|---|
|  | 4 | 5 | 3 | 4 |
| Lot No. | L-1 | L-2 | L-2 | L-3 |
| $\Delta EC_0$ ($\mu$S/cm) | 0.22 | 1.38 | no measurement | 9.8 |
| Free carboxylic acid content (meq/kg) | 1.33 | 11.32 | — | 1450 |
| Lauryl alcohol amount (% by weight) | 0.553 | 0.469 | 0.553 | 0 |
| Aimed MW | 185000 | 185000 | 185000 | — |
| Polylactic acid MW | 185000 | 183000 | 164000 | 6000 |

EXAMPLE 6

A methanol/water solvent mixture was prepared by mixing 79.6 g of methanol (guaranteed reagent) with 8.0 g of deionized water having an electric conductivity of 0.5 $\mu$S/cm or less. Temperature of the solvent mixture was controlled to 25° C. and electric conductivity was measured. Several kinds of glycolide which differed in manufacturing lot, storage conditions and purification degree were selected and 1.16 g (0.01 mol) of each glycolide was individually mixed with 1.44 g (0.01 mol) of DL-lactide. Each mixture obtained was individually dissolved in the above solvent mixture and electric conductivity of each solution was measured to obtain the value $\Delta EC$. The values of $\Delta EC$ were measured every 30 seconds and the relationship between the measuring time and the values of $\Delta EC$ were plotted to obtain a curve. The linear portion of the curve was extrapolated to obtain the value $\Delta EC_0$ at zero measuring time.

The mixture of each glycolide with DL-lactide in an equivalent mole ratio was used as the cyclic ester compound. DL-lactic acid was used as a hydroxyl compound (molecular weight regulator).

Several dozens batches of polymerization were carried out under the same reaction conditions described below except that the amount of added DL-lactic acid was altered. In any cases of polymerization, glycolic acid/lactic acid copolymers were obtained at the conversion of 98% or more. On the results of several dozens batches of polymerization, the values of $\Delta EC_0$ at zero measuring time, lactic acid amounts added to the reaction system, and molecular weight Mw's of the glycolic acid/lactic acid copolymers obtained were stored in the form of data base.

Glycolide (G-3) and DL-lactide (D-1) which differed from the lots used for preparation of the data base were mixed as above in a ratio of 1.16 g (0.01 mol) glycolide: 1.44 g (0.01 mol) DL-lactide. The mixture was dissolved in the above solvent mixture and the value $\Delta EC_0$ at zero time was obtained. The value $\Delta EC_0$ was 0.49 $\mu$S/cm.

In order to prepare a polymer having a molecular weight of 123,000, data which formed polymers of molecular weight 123,000±3,000 were searched and three data were found. In these three data, the relation between the value $\Delta EC_0$ and the amount of lactic acid added was individually 0.21 $\mu$S/cm and 0.365% by weight, 0.62 $\mu$S/cm and 0.345% by weight, and 0.88 $\mu$S/cm and 0.335% by weight. A curve illustrating the relation between the value $\Delta EC_0$ and the amount of lactic acid added was plotted. The optimum amount of lactic acid to be added was estimated at 0.350% on the basis of the curve when the value $\Delta EC_0$ above was 0.49 $\mu$S/cm.

To a 5,000 cm$^3$ stainless steel reaction vessel, 1,161 g of glycolide (D-1) and 1,441 g of DL-lactide were charged and a toluene solution of stannous octoate having a concentration of 0.345 g/10 cm$^3$ solvent was added so as to present 0.015% by weight of stannous octoate for the total amount of glycolide and lactide. The mixture was deaerated at 40° C. for an hour under reduced pressure of 10 mmHg.

After deaeration, the interior of the reaction vessel was replaced with nitrogen, 0.350% by weight of lactic acid was added, the reaction mixture was heated from 40° C. to 180° C. in a nitrogen atmosphere, polymerization was carried out successively at 180° C. for 2 hours, and a glycolic acid/lactic acid copolymer was obtained. The copolymer had a molecular weight of 121,000 which was almost equal to the aimed molecular weight.

Table 3 illustrates the value $\Delta EC_0$, amount of free carboxylic acid in the raw material, amount of hydroxyl of hydroxyl compound added to the reaction system, and weight average molecular weight Mw's of aimed and obtained polyesters.

EXAMPLE 7

A methanol/water solvent mixture was prepared by mixing 79.6 g methanol (guaranteed reagent) with 8.0 g of deionized water having an electric conductivity of 0.5 $\mu$S/cm or less. Temperature of the solvent mixture was controlled to 25° C. and electric conductivity was measured. Several kinds of glycolide which differed in manufacturing lot, storage conditions and purification degree were selected and 1.16 g (0.01 mol) of each glycolide was individually mixed with 0.057 g (0.0005 mol) of ε-caprolactone. Each mixture obtained was individually dissolved in the above solvent and electric conductivity of each solution was measured to obtain the value $\Delta EC$. The value $\Delta EC$ was measured every 30 seconds and the relation ships between the measuring times and the values of $\Delta EC$ were plotted to obtain a curve. The linear portion of the curve was extrapolated to obtain the value $\Delta EC_0$ at zero measuring time.

The mixture of each glycolide with ε-caprolactone in a mole ratio of 100:5 was used as the cyclic ester compound. Lauryl alcohol was used as a hydroxyl compound (molecular weight regulator).

Several dozens batches of polymerization were carried out under the same reaction conditions described below except that the amount of added lauryl alcohol was altered. In any cases of polymerization, glycolic acid/hydroxycaproic acid copolymers were obtained in the polymerization rate of 98% or more. On the results of several dozens batches of polymerization, the values of $\Delta EC_0$ at zero measuring time, amounts of lauryl alcohol added to the reaction system, and the molecular weight Mw's of the polymer obtained were stored in the form of data base.

Glycolide (G-3) and ε-caprolactone (C-1) which differed from the lots used for preparation of the data base were mixed in the same ratio as the above mole ratio and dissolved in the aforementioned solvent mixture and the value $\Delta EC_0$ was measured at zero time, The value $\Delta EC_0$ was 0.36 μS/cm. The amount of free carboxylic acid contained in the mixture of glycolide and ε-caprolactone was obtained from the value $\Delta EC_0$ on the basis of the calibration curve A in FIG. 1. The amount was 815 ppm, that is, 10.7 meq/kg as converted to glycolic acid.

In order to prepare a glycolic acid/hydroxycaproic acid copolymer having a molecular weight of 75,000, the amount of lauryl alcohol to be added to the reaction system was calculated from an empirical formula which was similar to the above Eq. 1 and had 0.4 in A and 49.8 in B, and fixed on 45.5 meq/kg, that is, 0.848% by weight for glycolide.

To a 5,000 cm³ stainless steel reaction vessel equipped with a stirrer and temperature regulator, 1,161 g of glycolide and 57 g of ε-caprolactone were charged and a toluene solution of stannous octoate having a concentration of 0.230 g/10 cm³ solvent was added so as to present 0.01% by weight of stannous octoate for the total amount of glycolide and ε-caprolactone. The mixture was deaerated at 40° C. for an hour.

After deaeration, the interior of the reaction vessel was replaced with nitrogen, 0.848% by weight of lauryl alcohol was added, the reaction mixture was heated from 40° C. to 180° C. in a nitrogen atmosphere, and polymerization was successively carried out at 220° C. for an hour to obtain a glycolic acid/hydroxycaproic acid copolymer. The copolymer had a molecular weight Mw of 73,900 which was almost equal to the aimed molecular weight. Results are illustrated in Table 3.

TABLE 3

|  |  | Example | |
| --- | --- | --- | --- |
|  |  | 6 | 7 |
| Lot No. |  | G-3/D-1 | G-3/C-1 |
| $\Delta EC_0$ (μS/cm) |  | 0.49 | 0.36 |
| Free carboxylic acid content (meq/kg) |  | — | 10.7 |
| Hydroxyl compound amount (wt %) | Lactic acid | 0.350 | — |
|  | Lauryl alcohol | — | 0.848 |
| Aimed Mw |  | 123000 | 75000 |
| Polyester Mw |  | 121000 | 73900 |

COMPARATIVE EXAMPLE 5

The amount of free carboxylic acid in glycolide was estimated by the following titration method using potassium methoxide ($KOCH_3$).

To a measuring flask, 15 cm³ of anhydrous methanol was charged and dry nitrogen was ventilated. After adding 5~6 drops of a phenol red solution (0.05% by weight), a $KOCH_3$-anhydrous methanol titrating solution having a concentration of 0.01N (normality was previously estimated by using benzoic acid as reference) was dropwise added from a buret. Addition was continued until phenol red indicated red.

Separately, 0.4~0.5 g of glycolide was precisely weighed and added to the solution. The solution turned yellow. The above titrating solution was dropwise added until the solution turned red. The amount of free carboxylic acid in glycolide was calculated from the normality of the titrating solution, the amount of dropwise addition and the amount of the glycolide sample.

The amount of free carboxylic acid in glycolide (G-1) was estimated three times by the above method. The amount was individually 1.94, 2.83 and 3.31 meq/kg and thus reproducibility of the results was poor. The titration method using potassium methoxide led to dispersion in the estimated values of free carboxylic acid. Consequently, the amount of the hdyroxyl compound to be added to the reaction system could not be fixed, and it was difficult to use the method for the molecular weight control of polyester.

COMPARATIVE EXAMPLE 6

Electric conductivity was measured by carrying out the same procedures as described in Example 1 except that the methanol/water solvent mixture having a component ratio of 79.6:8.0 by weight was replaced by 79.6 g of methanol alone. Almost no alteration was found on the electric conductivity between before and after the pouring of glycolide (G-1). The amount of free carboxylic acid in glycolide was impossible to estimate.

COMPARATIVE EXAMPLE 7

Electric conductivity was measured by carrying out the same procedures as described in Example 1 except that the methanol/water solvent mixture having a component ratio of 79.6:8.0 by weight was replaced by 79.6 g of water alone. Electric conductivity was rapidly and greatly increased immediately after the pouring of glycolide (G-1). Consequently, the amount of free carboxylic acid in glycolide (G-1) was impossible to estimate.

COMPARATIVE EXAMPLE 8

Electric conductivity was measured by carrying out the same procedures as described in Example 1 except that the methanol/water solvent mixture having a component ratio of 79.6:8.0 by weight was replaced with a methanol/water solvent mixture having a component ratio of 100:60 by weight. Electric conductivity was rapidly and greatly increased immediately after the pouring of glycolide (G-1). A curve illustrating the relation between the measured time of electric conductivity and the value $\Delta EC$ was plotted. A linear portion of the curve indicating 1~3 minutes after starting the measurement was extrapolated to zero time and the value $\Delta EC_0$ was read. The value $\Delta EC_0$ was 0.42 μS/cm. Procedures for reading electric conductivity was further repeated twice on the same lot of glycolide. The values of $\Delta EC$ thus obtained were 0.58 and 0.37 μS/cm. Thus, precise estimation$_0$ could not be achieved due to large dispersion.

This may be practiced or embodied in still other ways without depreting from the spirit or essential character thereof.

However, these samples are not intended to limit the scope of the present invention. Thus may be practiced or embodied in still other ways without departing from the spirit or essential character thereof.

We claim:

1. A preparation process of polyester by adding a hydroxyl compound as a molecular weight regulator to a reaction system and conducting ring-opening polymerization of a cyclic ester compound, comprising fixing an amount of the hydroxyl compound to be added to the reaction system on the basis of the amount of free carboxylic acid contained in the cyclic ester compound.

2. A preparation process of polyester according to claim 1, wherein the hydroxyl compound is one or more compounds selected from alcohol, hydroxycarboxylic acid and saccharide.

3. A preparation process of polyester according to claim 2, wherein the alcohol is one or more monohydric straight chain saturated aliphatic alcohol having 12~18 carbon atoms.

4. A preparation process of polyester according to claim 2, wherein the hydroxycarboxylic acid is one or more compounds selected from glycolic acid, lactic acid, hydroxypropanoic acid, hydroxycaproic acid and an oligomer of the same.

5. A preparation process of polyester according to claim 2, wherein the hydroxycarboxylic acid is one or more compounds selected from glycolic acid and lactic acid.

6. A preparation process of polyester according to claim 1, wherein the cyclic ester compound is one or more compounds selected from glycolide, lactide, $\beta$-propiolactone, $\gamma$-butyrolactone, $\delta$-valerolactone, $\epsilon$-caprolactone, 3-methyl-1,4-dioxa-2,5-dione, $\rho$-dioxanone, morpholine-2,5-dione and morpholine-2-one.

7. A preparation process of polyester according to claim 1, wherein the cyclic ester compound is one or more compounds selected from glycolide, lactide and $\epsilon$-caprolactone.

8. A preparation process of polyester according to claim 1, wherein the cyclic ester compound containing 100 meq/kg or less of the free carboxylic acid is used for preparation of polyester having a molecular weight of less than 100,000.

9. A preparation process of polyester according to claim 1, wherein the cyclic ester compound containing 50 meq/kg or less of the free carboxylic acid is used for preparation of polyester having a molecular weight of 100,000~200,000.

10. A preparation process of polyester according to claim 1, wherein the cyclic compound containing 30 meq/kg or less of the free carboxylic acid is used for preparation of polyester having a molecular weight of more than 200,000.

11. A preparation process of polyester according to claim 1, wherein the amount of free carboxylic acid contained in the cyclic ester compound is estimated by measuring electric conductivity of a solution of the cyclic ester compound.

12. A preparation process of polyester according to claim 11, wherein the solution of the cyclic ester compound is obtained by dissolving the cyclic ester compound in a solvent mixture comprising 100 parts by weight of hydrophilic organic solvent and 1~50 parts by weight of water.

13. A preparation process of polyester according to claim 12, wherein the hydrophilic organic solvent is one or more alcohol selected from methanol and ethanol.

14. A preparation process of polyester according to claim 12, wherein 0.1~20 parts by weight of the cyclic ester compound is dissolved in 100 parts by weight of the solvent mixture.

15. A preparation process of polyester according to claim 11, wherein the amount of the hydroxyl compound to be added to the reaction system is fixed by estimating the amount of free carboxylic acid through electric conductivity measurement and converting the obtained value to the amount of the hydroxyl compound.

16. A preparation process of polyester according to claim 1, wherein the ring-opening polymerization is carried out in the presence of a catalyst.

17. A preparation process of polyester according to claim 1, wherein the ring-opening polymerization is carried out in a temperature range of 80°~280° C.

* * * * *